United States Patent
Dweek

(10) Patent No.: US 8,201,837 B2
(45) Date of Patent: Jun. 19, 2012

(54) SKATEBOARD BACKPACK SYSTEM

(75) Inventor: Steven Dweek, Oakhurst, NJ (US)

(73) Assignee: Animations an Accessory Innovations Company, New York, NY (US)

( * ) Notice: Subject to any disclaimer, the term of this patent is extended or adjusted under 35 U.S.C. 154(b) by 484 days.

(21) Appl. No.: 12/603,051

(22) Filed: Oct. 21, 2009

(65) Prior Publication Data

US 2011/0089650 A1    Apr. 21, 2011

(51) Int. Cl.
  *B62B 1/04* (2006.01)
  *B62B 3/02* (2006.01)
  *A45F 4/02* (2006.01)
  *A45C 15/00* (2006.01)
(52) U.S. Cl. ......... 280/30; 280/37; 280/38; 280/87.041; 280/47.18; 224/153; 224/576
(58) Field of Classification Search .................. 280/30, 280/639, 37, 38, 87.041, 87.042, 47.131, 280/47.18, 47.19; 224/153, 576, 577
See application file for complete search history.

(56) References Cited

U.S. PATENT DOCUMENTS

| | | | | |
|---|---|---|---|---|
| 4,227,710 A * | 10/1980 | Laub | ............................ | 280/47.19 |
| 4,570,958 A * | 2/1986 | Walker | ............................ | 280/40 |
| 6,460,866 B1 * | 10/2002 | Altschul et al. | ................. | 280/30 |
| 6,688,614 B2 * | 2/2004 | Hsu | ................................. | 280/37 |
| 7,246,805 B2 * | 7/2007 | Neal et al. | ........................ | 280/35 |
| 7,731,204 B2 * | 6/2010 | Turner et al. | ..................... | 280/30 |
| 7,837,206 B1 * | 11/2010 | Lee | ..................................... | 280/37 |
| 2004/0056442 A1 * | 3/2004 | Ostrowski et al. | ........ | 280/87.041 |
| 2004/0094919 A1 * | 5/2004 | Roder et al. | ..................... | 280/30 |
| 2005/0218171 A1 | 10/2005 | Bellerive | | |
| 2006/0273534 A1 | 12/2006 | Turner | | |

FOREIGN PATENT DOCUMENTS

DE   3138095 A1 *  4/1983

* cited by examiner

*Primary Examiner* — John R Olszewski
(74) *Attorney, Agent, or Firm* — Arent Fox LLP

(57) ABSTRACT

Disclosed are a backpack skateboard system and methods for use thereof in which a skateboard is movably attached to a backpack, so that the skateboard can pivot 180° along the longitudinal axis thereof and rotate 90° into a folded configuration in which the skateboard is substantially parallel to the backpack with rear wheels of the skateboard facing the backpack and pivot 180° along the longitudinal axis thereof and to rotate 90° into an unfolded configuration in which the skateboard is substantially perpendicular to the backpack with the rear wheel assembly positioned downward.

25 Claims, 9 Drawing Sheets

SKATEBOARD BACKPACK SYSTEM

TECHNICAL FIELD

The present disclosure relates generally to the field of wheeled carriers and, more specifically, to a wheeled backpack system having an attached foldable/unfoldable skateboard.

BACKGROUND

Wheeled carriers are very popular among students, travelers, business professionals and others, because they combine large carrying capacity with the convenience of rolling the carrier instead of carrying it. In some instances, the wheeled carriers can also be fitted with straps and used as backpacks, which adds an extra level of comfort to the users. Despite numerous advantages of wheeled carriers over the carry-on luggage, wheeled carriers generally limit user's ability to move freely and quickly. Having recognized this problem, the present invention provides a novel backpack system with a foldable skateboard, which allows the system's users to use the backpack as a personal transportation device. The disclosed system can therefore be easily converted between a rolled backpack to its backpack/skateboard configuration. This flexibility of configuration options provides a great convenience to the system's users.

SUMMARY

Disclosed herein is a novel backpack skateboard system. In one example embodiment, the system includes a base member having a front wheel assembly mounted thereon and a frame member mounted on the base member. The frame member has an extendible handle member affixed thereto. The system further includes a pack member mounted on the frame member for carrying articles. The system also includes a board member movably attached to the base member for supporting a rider. The board member includes a front end and a rear end spaced away from the front end along a longitudinal axis. The rear end of the board member includes a rear wheel assembly affixed thereto.

The system also includes a mount assembly movably joining the front end of the board member to the base member. The mount assembly allows the board member to pivot about 180° along the longitudinal axis thereof and to rotate about 90° into a folded configuration in which the board member is substantially parallel to the frame member with the rear wheel assembly facing the frame member. The mount assembly also allows the board member to pivot about 180° along the longitudinal axis thereof and to rotate about 90° into an unfolded configuration in which the board member is substantially perpendicular to the frame member with the rear wheel assembly facing the ground. To facilitate pivotal/rotation movement, the mount assembly includes a pivot pin pivotally attached to the board member and rotatably attached to the base member.

In one example embodiment, the system may further include a spring-loaded locking mechanism affixed to the mount assembly for securing the board member to the base member in one of the folded configuration and the unfolded configuration.

In one example embodiment, the pack member includes an enclosure for housing the rear wheel assembly when the board member is in the folded configuration. The pack member also includes straps for carrying the system. The pack member may also include a detachable flap for covering the board member in the folded configuration. A movable kickstand is also incorporated in the system so as to provide support when the system is not being moved or carried by the user.

Other example embodiments and aspects of the invention will be described herein below in greater detail with reference to the enclosed figures.

BRIEF DESCRIPTION OF THE DRAWINGS

The accompanying drawings, which are incorporated into and constitute a part of this specification, illustrate one or more example embodiments of the invention and, together with the detailed description serve to explain the principles and implementations of the embodiments.

In the drawings.

DESCRIPTION OF EXAMPLE EMBODIMENTS

Example embodiments of a novel skateboard backpack system and the methods for operation thereof are disclosed herein. Those of ordinary skill in the art will realize that the following description is illustrative only and is not intended to be in any way limiting. Other embodiments will readily suggest themselves to those of ordinary skill in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
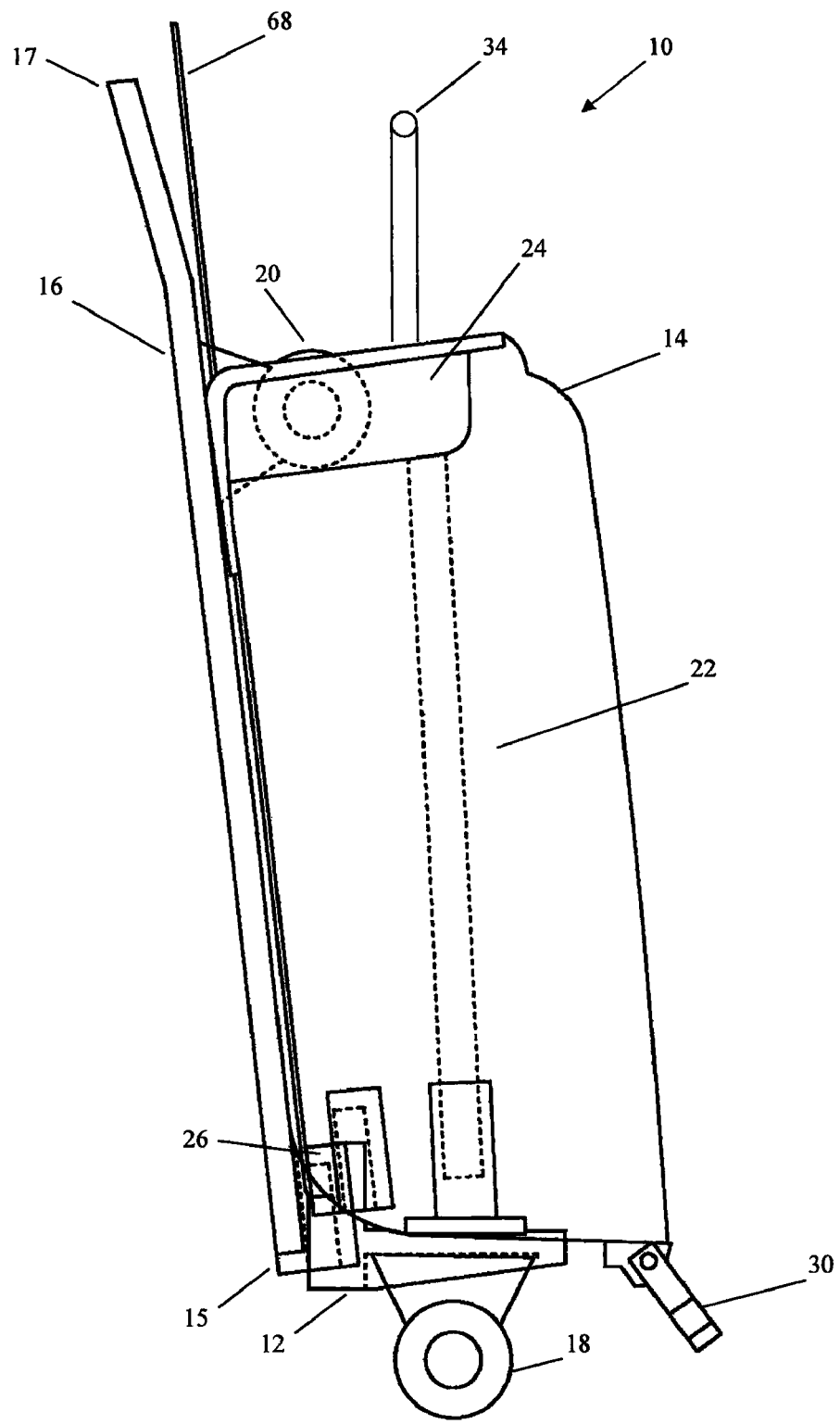
FIG. 1 is a side perspective view of a folded skateboard backpack system in accordance with one example embodiment.
Figure 2:
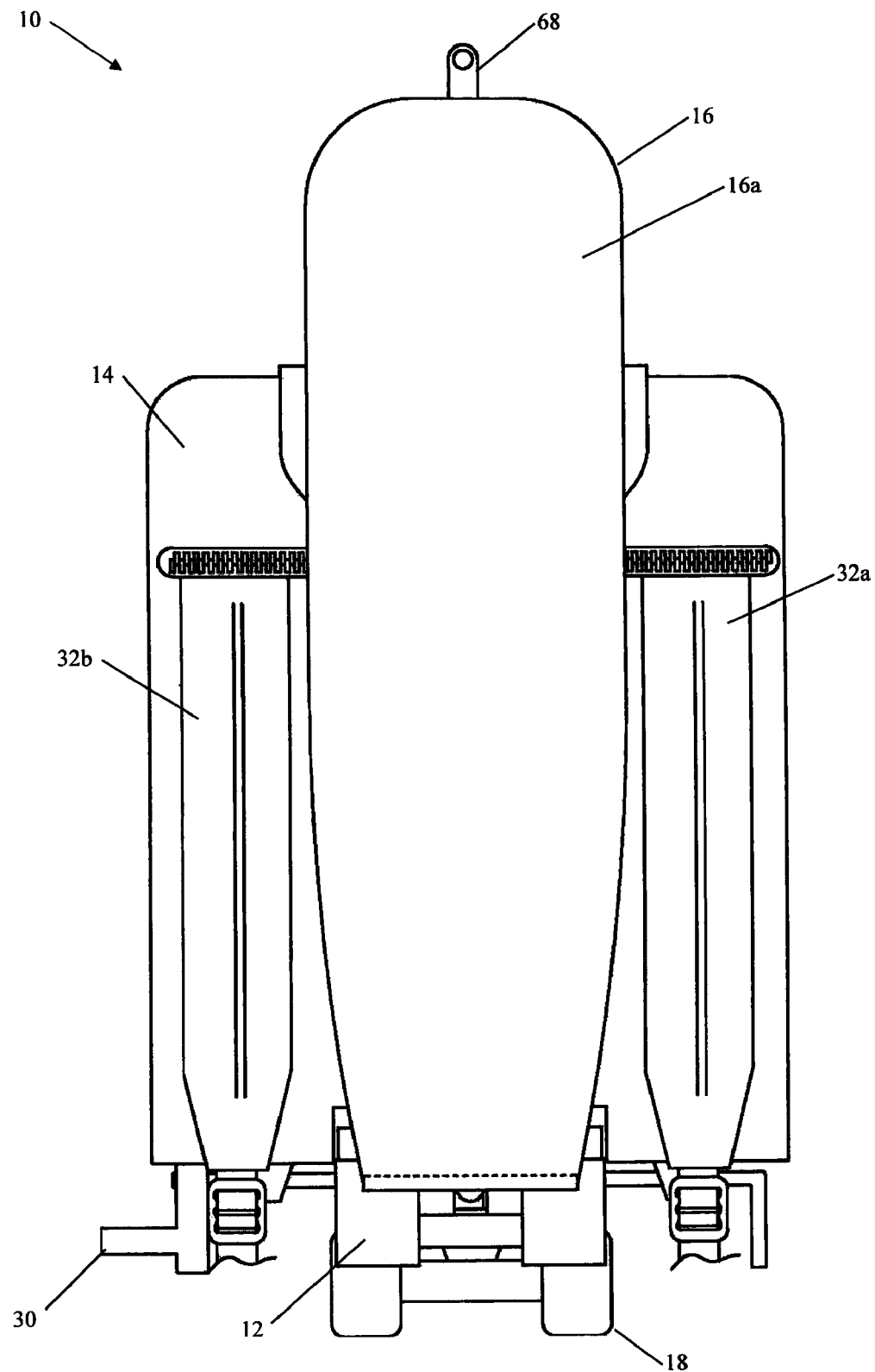
FIG. 2 is a rear perspective view of the folded skateboard backpack system of FIG. 1.

Reference is now made to the drawing, and especially to FIGS. 1 through 8 thereof, in which a skateboard backpack system 10 in accordance with one example embodiment is shown. In general, the system 10 includes a wheeled pack member 14 having a handle 34 and a skateboard 16 movably attached to wheeled pack member 14. The system 10 is capable of being converted from a wheeled pack configuration in which the skateboard 16 is folded, as shown in FIGS. 1 and 2, so that the pack member 14 can be wheeled or carried by the user, to a skateboard pack configuration in which the skateboard is unfolded, as shown in FIGS. 3, 4, 5 and 6, and can be ridden by a user in a conventional manner; that is, the user being supported by the skateboard 16, grasps the handle 34 and moves the system 10 in a particular direction.

In one example embodiment, the system 10 may include a base member 12 having a front wheel assembly 18 attached thereto. The base member 12 may be made of a metal, a metal alloy or other rigid, durable and lightweight material capable of supporting the weight of a full pack member 14 and a user (i.e., rider). The front wheel assembly 18 may include two rubber wheels spaced apart laterally from one another. The system 10 further includes a rigid frame member 22 mounted on the base member 12. In one example embodiment, the frame member 22 may include two metal rods or tubes extending in a general altitudinal direction from the base member 12. The frame member 22 may have affixed thereto (or embedded therein) an extendible handle 34. The system 10 also includes a pivoted or rotatable kickstand 30 attached to the base member 12, that when extended downward, provides support and allows the system to maintain an upright position when the user is not moving the system via the handle 34 or carry the system 10.

In one example embodiment, the system 10 may include a pack member 14 mounted on the frame member 22 and/or on the base member 12. The pack member 14 extends in the general altitudinal direction upwardly from the base member 12 along a longitudinal axis 23. The pack member 14 may be constructed of a material which is flexible, yet stiff enough to retain a desired shape, such as a synthetic polymeric fabric material reinforced with filament reinforced polyester. The pack member 14 may include an inner housing establishing one or more compartments or pockets for carrying articles. Multiple slide fastener closures may be used to provide access to the compartments and close the compartments for effective protection against the loss of any contents thereof. The pack member 14 may also include straps 32a and 32b for carrying the system 10 as a backpack.

In one example embodiment, the system 10 may include a skateboard 16 movably attached to the base member 12. The skateboard 16 includes an elongated board member having a rider-supporting surface 16a, a front end 15 and a rear end 17 spaced away from the front end 15 along a longitudinal axis 21. The skateboard 16 may be made of plywood, plastic, a combination thereof or other rigid, lightweight materials known to those of skill in the art. The skateboard 16 includes a rear wheel assembly 20 mounted on the rear end 17 of the board member. The rear wheel assembly 20 may include two rubber wheels spaced apart laterally from one another. The front end 15 of the skateboard 16 is movably attached to the base member 12 using a mount assembly 26.

Figure 3:
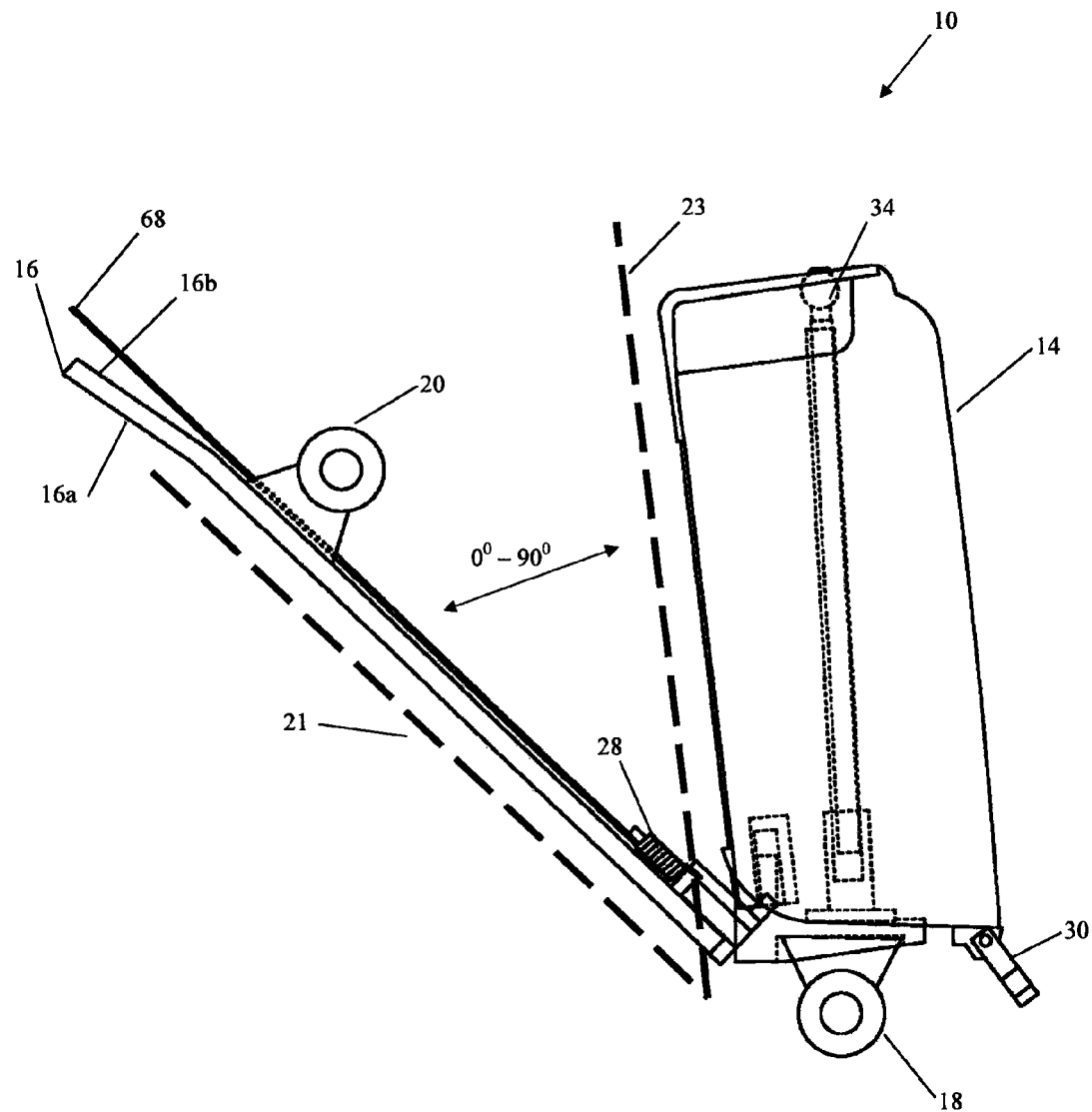
FIGS. 3 and 4 are side perspective views illustrating the operations of folding/unfolding and rotating a skateboard backpack system, respectively, in accordance with one example embodiment.
Figure 4:
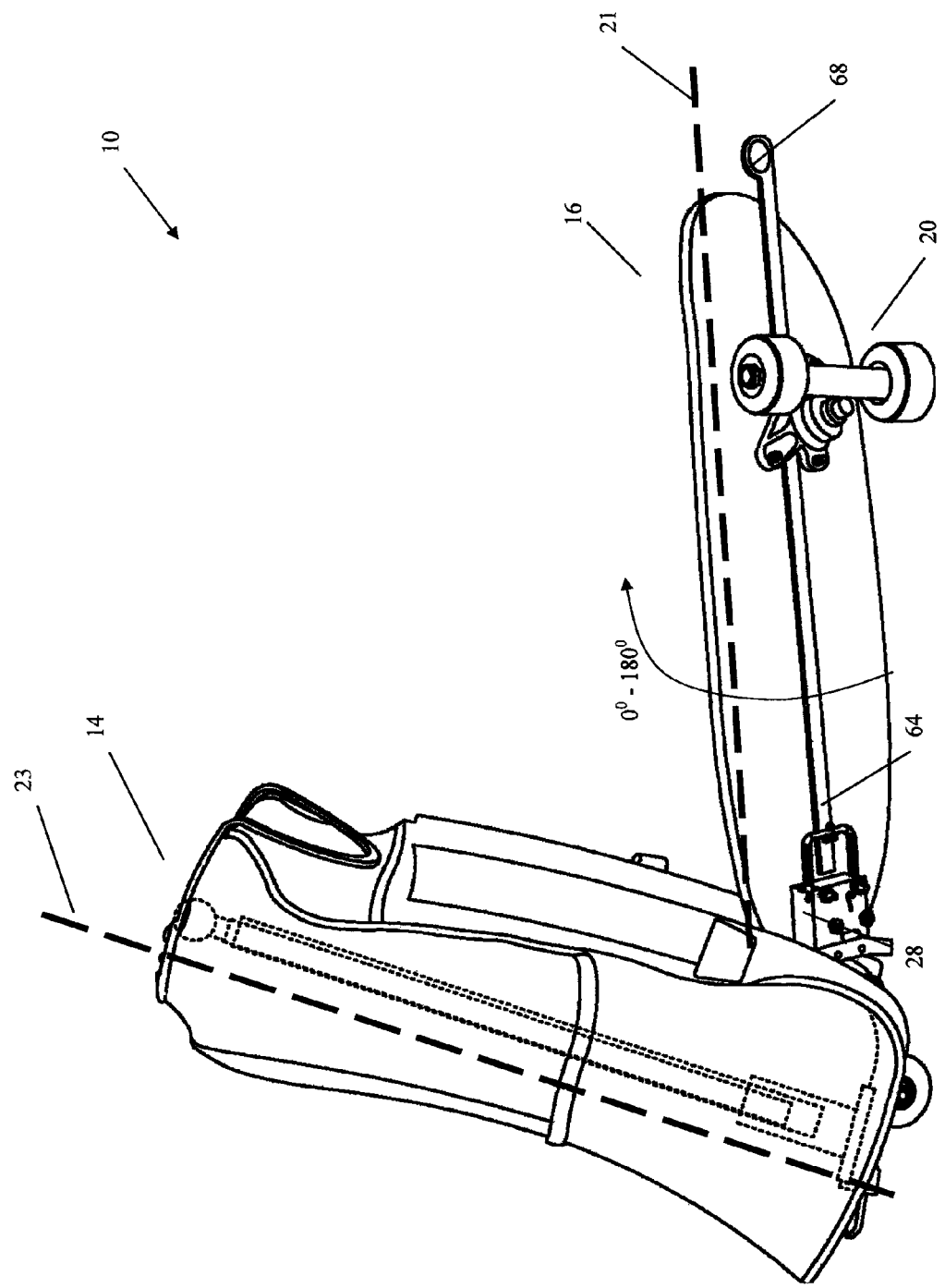
Figure 5:
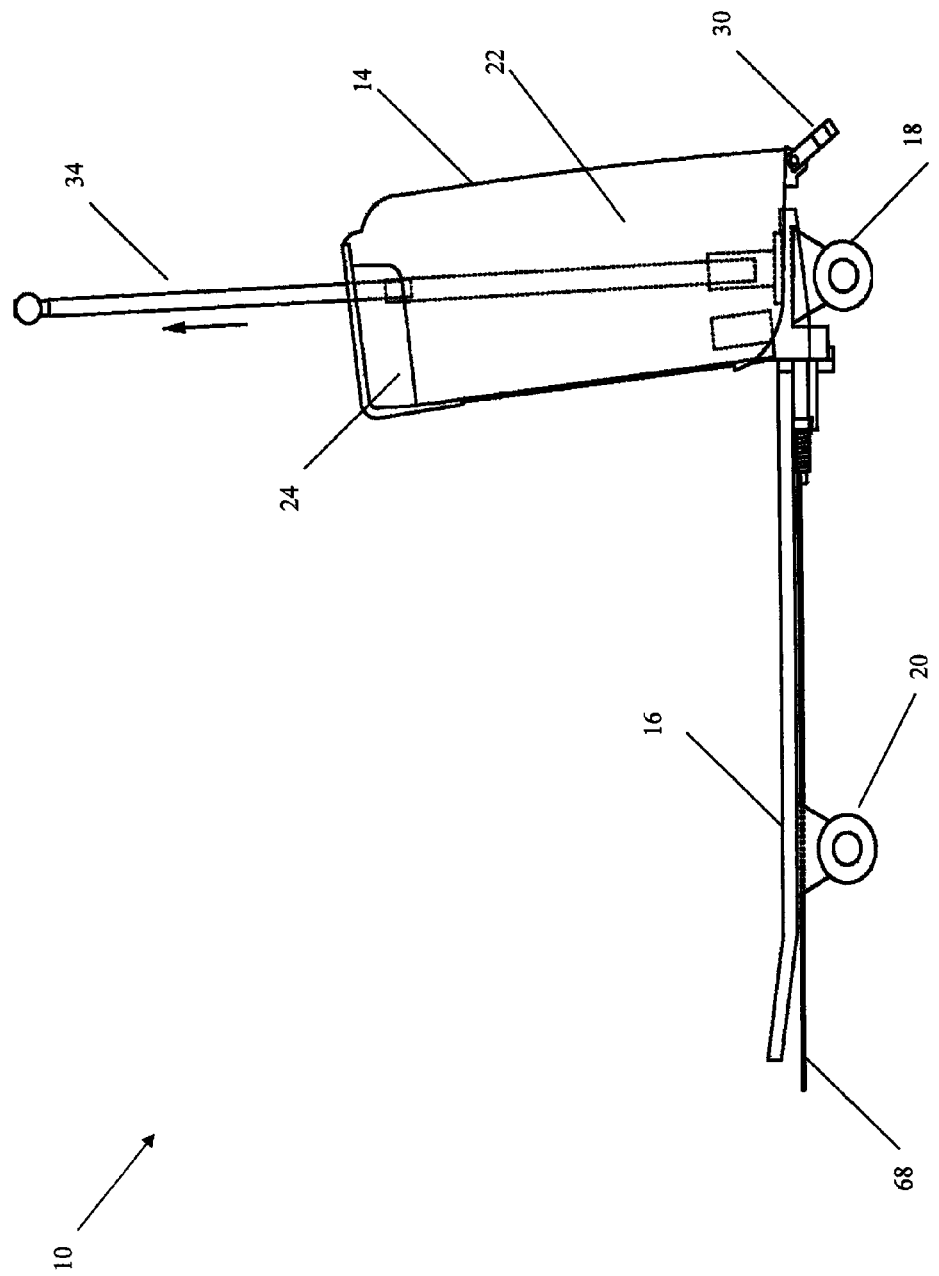
FIG. 5 is a side perspective view of an unfolded skateboard backpack system in accordance with one example embodiment.
Figure 6:
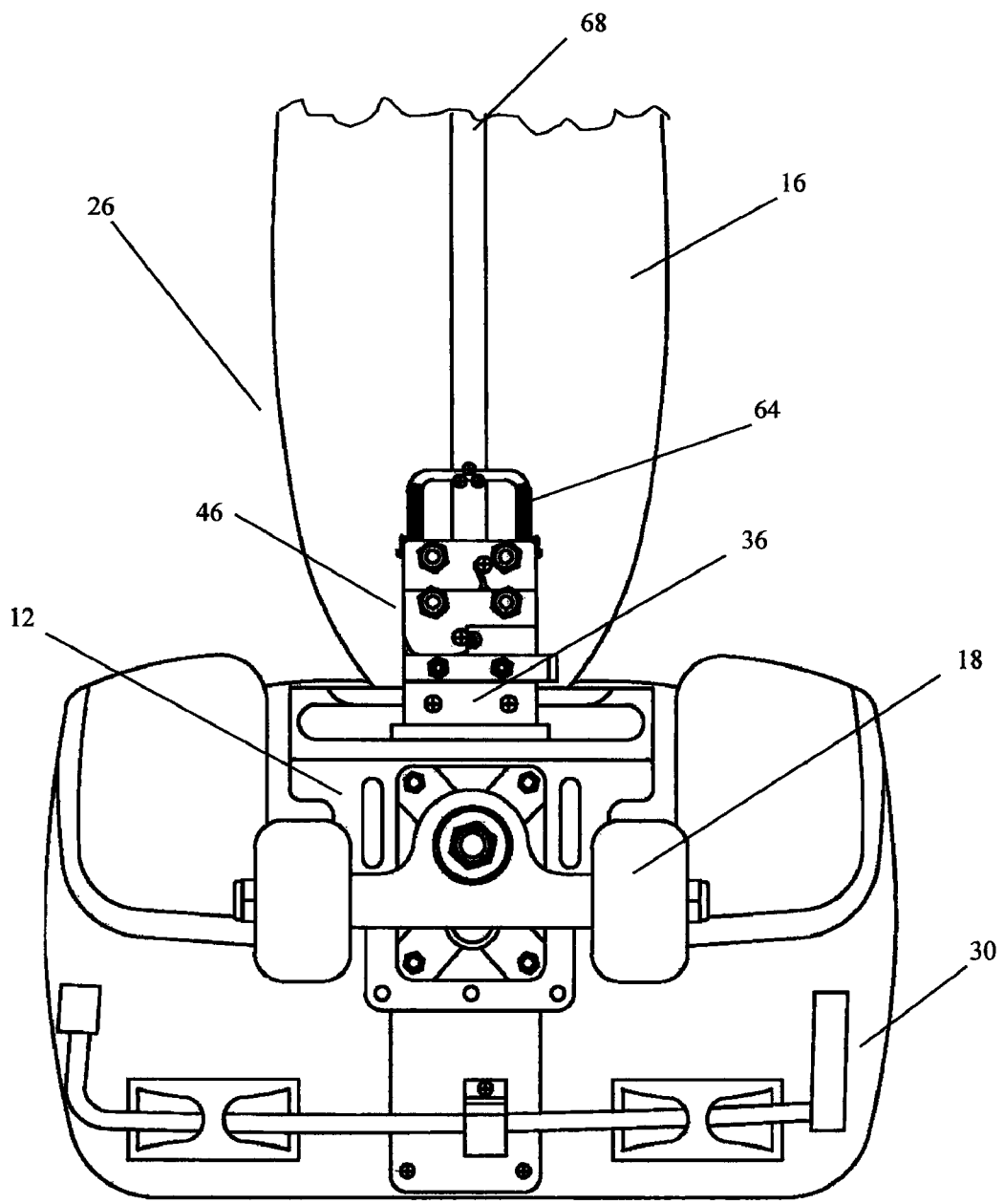
FIG. 6 is a bottom perspective cut-away view of a mount assembly and wheel assembly of the folded skateboard backpack system in accordance with one example embodiment.
Figure 7B:
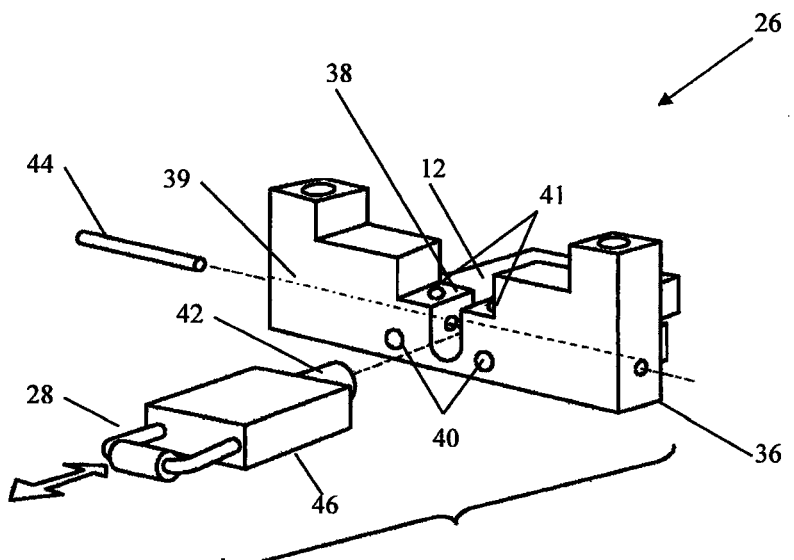
FIG. 7a is a rear and side perspective view of the unfolded skateboard backpack system and FIG. 7b is an exploded fragmentary rear and perspective view of a mount assembly of the skateboard backpack system in accordance with one example embodiment.
Figure 7A:
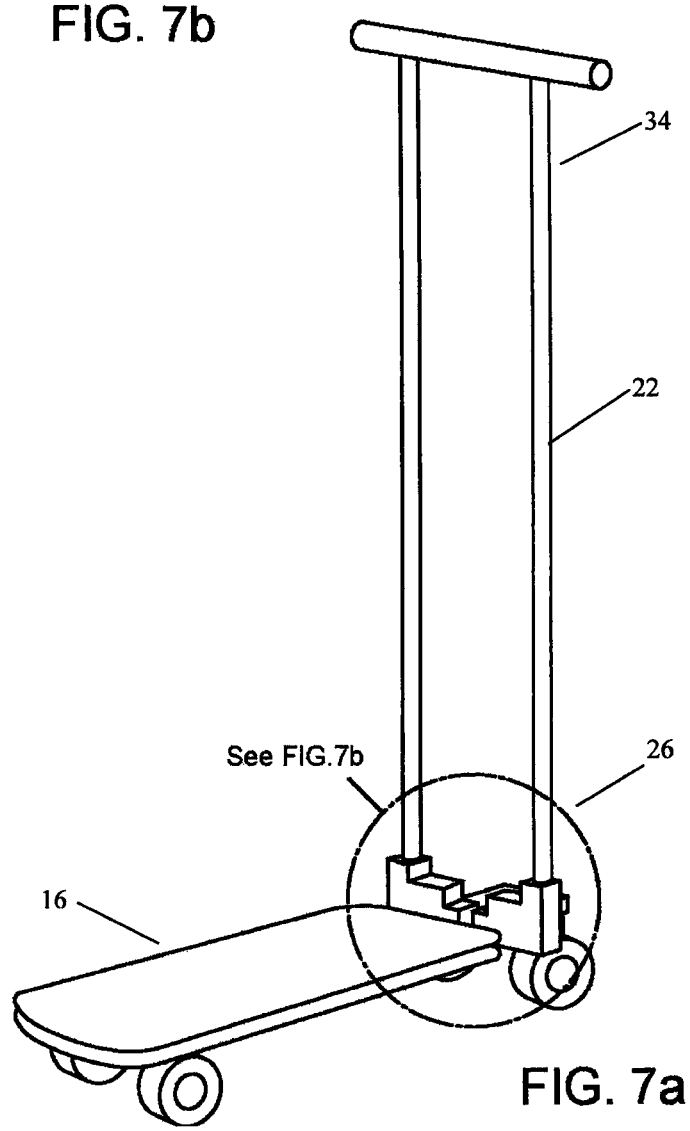
Figure 8A:
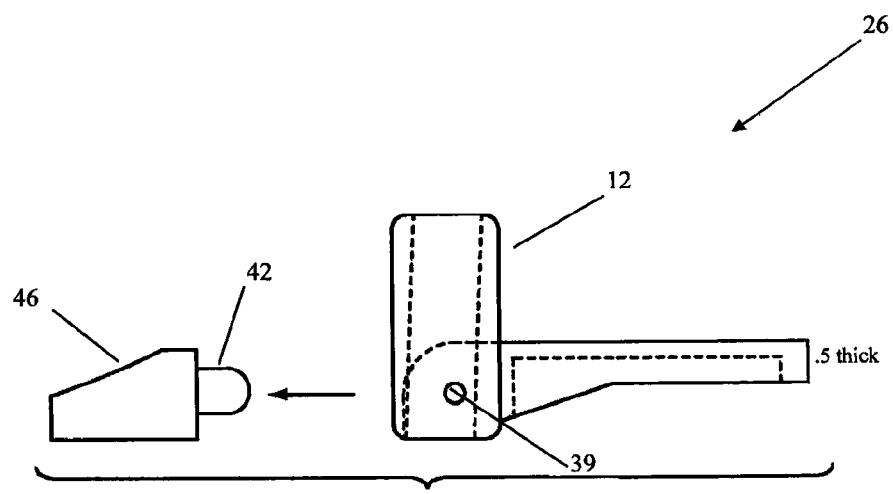
FIGS. 8a-8e are front, side and bottom perspective views of component parts of the skateboard backpack system in accordance with one example embodiment.
Figure 8B:
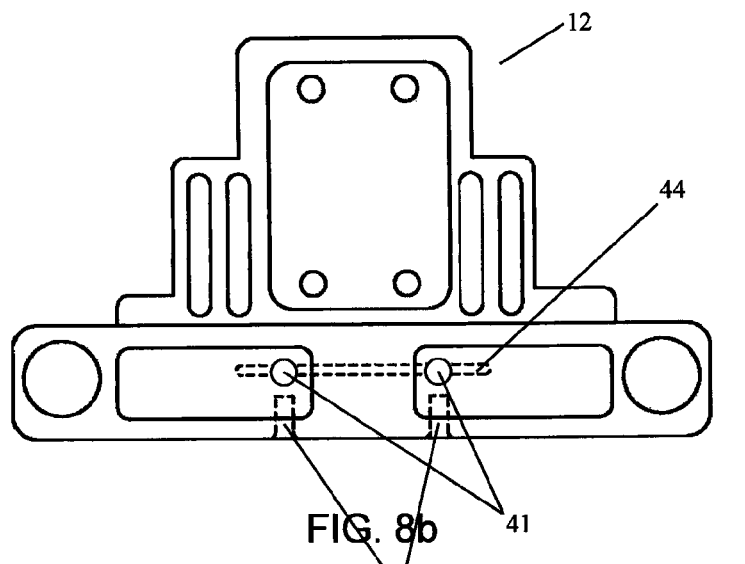
Figure 8C:
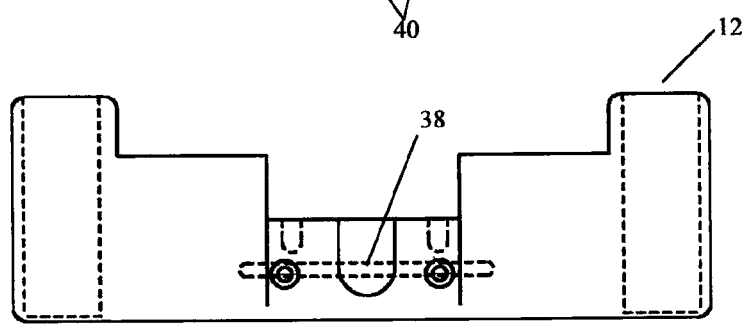
Figure 8D:
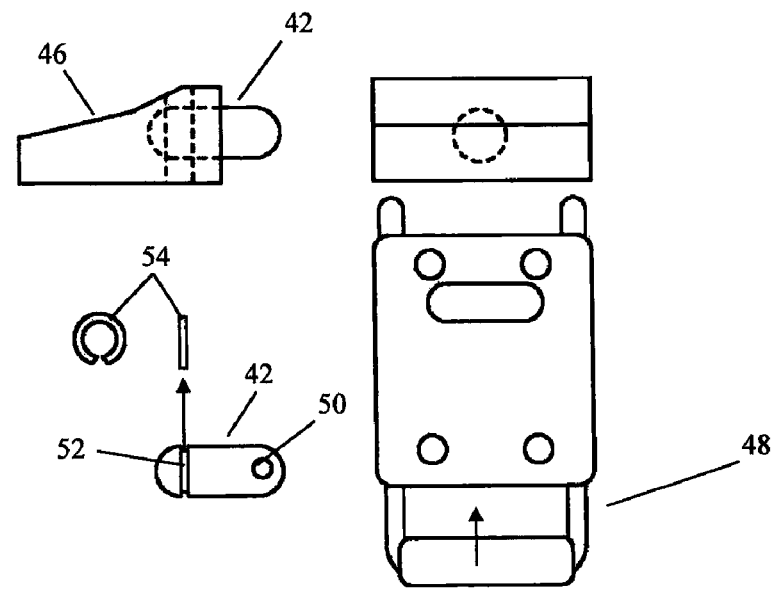
Figure 8E:
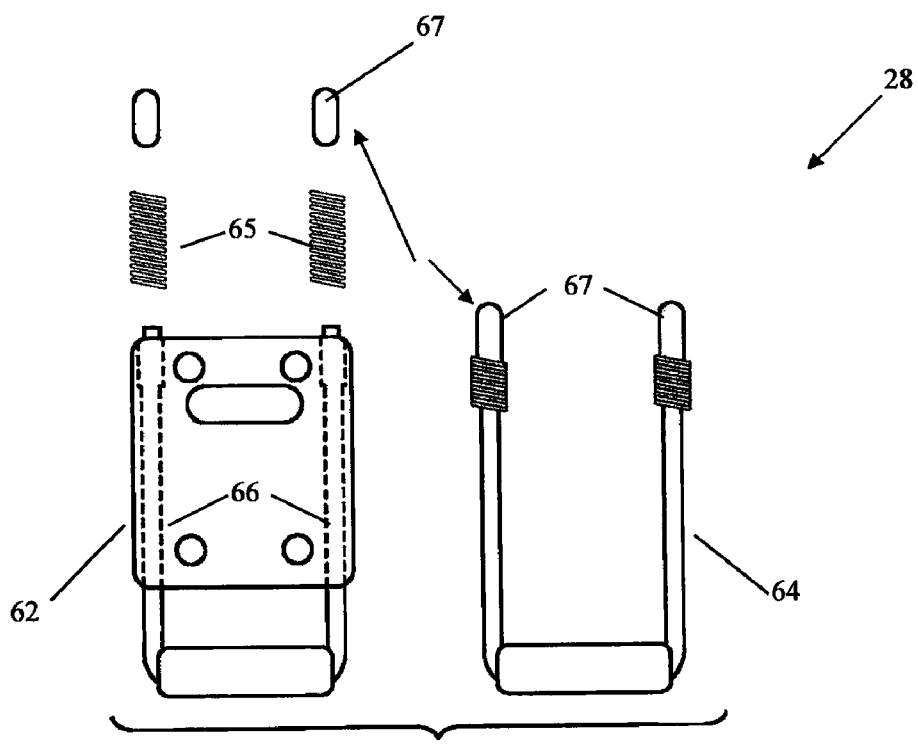

In one example embodiment, the mount assembly 26 allows the skateboard 16 to pivot and rotate relative to the pack member 14, as depicted in FIGS. 3, 4 and 5. In particular, to convert the system 10 from a folded to an unfolded configuration, the skateboard 16 may be first rotated by the user by about 90° relative to its point of attachment to the base member 14, as shown in FIG. 3, and then pivoted by about 180° along a longitudinal axis 21, as shown in FIG. 4. In a fully unfolded configuration depicted in FIGS. 5 and 6, the skateboard 16 is substantially perpendicular to the pack member 14 with the rear wheel assembly 20 facing the ground. In this configuration, a user may ride the system 10 by standing with one foot on the skateboard 16, holding the retracted handle 34 and pushing with one's other foot on the ground in order to move the system 10 in a designated direction.

To convert the system 10 from the unfolded to the folded configuration, as shown in FIGS. 1 and 2, the skateboard 16 may be first pivoted by the user by about 180° along the longitudinal axis 21, as further shown in FIG. 4, and then rotated by about 90° relative to its point of attachment to the base member 14, as further shown in FIG. 3. In the fully folded configuration, the skateboard 16 is substantially parallel to the pack member 14 with the board member fitting between the frame member 22 and the rear wheel assembly 20 being housed in a wheel enclosure 24 of the pack member 14 in accordance with one example embodiment. In this configuration, the user may use the system 10 as a wheeled carrier by pulling/pushing on the retracted handle 34 and rolling the system 10 on the front wheel assembly 18 or as a backpack by carrying the system 10 on one's back using straps 32a and 32b.

FIGS. 6, 7a-7b and FIGS. 8a-8e depict one example embodiment of the mount assembly 26. The mount assembly 26 includes a board mount 46 fixedly attached to front end 15 of the skateboard 16 and a hinge member 36 fixedly attached to (or integral or partially integral with) the base member 12. The board mount 46 and the hinge member 36 are movably connected to each other using a pivot pin 42. In particular, the pivot pin 42 includes a circumferential recess 52 and a latitudinal recess 50. The board mount 46 houses a circular locking spring 54 suitable for engaging the circumferential recess 52 of the pivot pin 42, so that the pivot pin 42 can pivot with at least 180° of freedom within the board mount 46 along the longitudinal axis 21 of the skateboard 16. The hinge member 36 includes a latitudinal recess 38 suitable for accepting a pivot pin 42 and a longitudinal recess 39 for accepting a rotation pin 44. The rotation pin 44 is suitable to pass through the latitudinal recess 50 of the pivot pin 42, when the pivot pin 42 is housed in the latitudinal recess 38 of the hinge member 36. In this manner, the pivot pin 42 (and the board mount 46 attached thereto) is movably attached to the hinge member 36, so that the pivot pin 42 can rotate around the rotation pin 44 with at least 90° of freedom relative to the hinge member 36. Other configurations and types of mount assemblies may be used in alternative embodiments.

FIGS. 6, 7a-7b and FIGS. 8a-8e also depict an optional locking mechanism 28 attached to the mount assembly for securing the skateboard 16 to the base member 12 in either folded or unfolded configurations. The locking mechanism 28 includes a lock mount 62, which may be mounted on the front end 15 of the skateboard 16. The lock mount 62 may include two longitudinal recesses 66 that accept a spring-loaded U-shaped locking pin 64, which in released position protrudes through the longitudinal recesses 66 with plastic tips 67 emerging on the other end of the recesses 66. The plastic tips 67 of the locking pin 64 are shaped to engage the locking recesses 40 or locking recesses 41 formed in the hinge member 36 of the base member 12. In one example embodiment, the locking recesses 40 and 41 may not be equidistant from the center of the latitudinal recess 38 of the hinge member 36, so that the tips 67 of the locking pin 64 do not lock until the skateboard rotates the entire 180°. Other configurations of locking mechanisms may be used in alternative embodiments.

The locking mechanism operates as follows. To secure the skateboard 16 in the folded configuration, the user may pull on the spring-loaded locking pin 64 using an extension handle 68, align tips 67 of the locking pin 64 with locking recesses 41 in the hinge member 36 and release the spring-loaded locking pin 64, whereby springs 65 of the locking mechanism 28 push the tips 67 of the locking pin 64 into the locking recesses 41, thereby securing the skateboard 16 to the base member 12 in the folded configuration. To release the skateboard 16 from the locked position, the user may pull on the spring-loaded locking pin 64 using the extension handle 68 and withdrawn the tips 67 of the locking pin 64 from the locking recesses 41.

The user may then unfold the skateboard 16, as described hereinabove, and secure it in the unfolded configuration. To do that, the user may pull on the spring-loaded locking pin 64 using the extension handle 68, align the tips 67 of the locking pin 64 with the locking recesses 40 in the hinge member 36 and release the spring-loaded locking pin 64, whereby the springs 65 push the tips 67 of the locking pin 64 into the locking recesses 40, thereby securing the skateboard 16 to the base member 12 in the unfolded configuration.

It should be appreciated that the disclosed skateboard backpack system provides numerous advantages over prior art solutions. The system can be easily converted and used as a backpack, a wheeled carrier or a personal transportation device. It can be readily used for transporting a great variety of articles with convenience and ease in the storage. At the same time, the skateboard backpack system is compact, lightweight and durable and provides a great degree of freedom and ease in transportation. In addition, the system can be manufactured in variety of sizes to accommodate children, adolescents and adults. Other advantages of the disclosed skateboard backpack system may be apparent to those of ordinary skill in the art.

In the interest of clarity, not all of the routine features of the implementations described herein are shown and described. It will be appreciated that in the development of any such actual implementations, numerous implementation-specific decisions must be made in order to achieve the developer's specific goals, such as compliance with the system-related or consumer-imposed constraints, and that these specific goals will vary from one implementation to another and from one developer to another. Moreover, it will be appreciated that such a development effort might be complex and time-consuming, but would nevertheless be a routine undertaking of engineering for those of ordinary skill in the art of mechanical engineering having the benefit of this disclosure.

Furthermore, it is to be understood that the phraseology or terminology used herein is for the purpose of description and not of limitation, such that the terminology or phraseology of the present specification is to be interpreted by those of ordinary skill in the art in light of the teachings and guidance presented herein, in combination with the knowledge of those of ordinary skill in the art. Moreover, it is not intended for any term in the specification or claims to be ascribed an uncommon or special meaning unless explicitly set forth as such. The various example embodiments disclosed herein encompass present and future known equivalents to the known components referred to herein by way of illustration. Moreover, while embodiments and applications have been shown and described, it would be apparent to those of ordinary skill in the art having the benefit of this disclosure that many more modifications than mentioned above are possible without departing from the inventive concepts disclosed herein.

What is claimed is:

1. A skateboard backpack system comprising:
   a base member having a front wheel assembly mounted thereon;
   a frame member mounted on the base member, the frame member having an extendible handle member affixed thereto;
   a pack member mounted on the frame member;
   a board member movably attached to the base member, the board member includes a front end and a rear end spaced away from the front end along a longitudinal axis of the board member, wherein the rear end of the board member includes a rear wheel assembly affixed thereto; and
   a mount assembly movably joining the front end of the board member to the base member, wherein the mount assembly allows the board member: (i) to pivot about 180° along the longitudinal axis thereof and to rotate about 90° into a folded configuration in which the board member is substantially parallel to the frame member with the rear wheel assembly facing the frame member; and (ii) to rotate about 90° and to pivot about 180° along the longitudinal axis thereof into an unfolded configuration in which the board member is substantially perpendicular to the frame member and the rear wheel assembly positioned downward.

2. The system of claim 1, further comprising a spring-loaded locking mechanism attached to the mount assembly for securing the board member to the base member in one of the folded and the unfolded configurations.

3. The system of claim 1, wherein the mount assembly includes a pivot pin pivotally attached to the board member and rotatably attached to the base member.

4. The system of claim 1, wherein the pack member includes an enclosure for housing the rear wheel assembly when the board member is the folded configuration.

5. The system of claim 1, wherein the frame member includes two parallel spaced apart rods mounted on the base member and wherein the board member is shaped to fit between said rods when in the folded configuration.

6. The system of claim 1, wherein the handle is extendable in a generally altitudinal direction upwardly from the frame member.

7. The system of claim 1, wherein the rear wheel assembly includes at least two wheels.

8. The system of claim 1, wherein the pack member includes one or more straps affixed thereto for carrying the system.

9. The system of claim 1, wherein the pack member includes a flap detachably affixed thereto for covering the board member in the folded configuration.

10. A skateboard backpack system comprising:
    a backpack having an extendible handle and a least one set of front wheels affixed thereto;
    a skateboard having at least one set of rear wheels affixed thereto; and
    a mount assembly movably joining the backpack and the skateboard, wherein the mount assembly allows the skateboard: (i) to pivot along a longitudinal axis of the skateboard and to fold into a substantially parallel position relative to a longitudinal axis of the backpack with the set of rear wheels facing the backpack; and (ii) to pivot along the longitudinal axis of the skateboard and to unfold into a substantially perpendicular position relative to the longitudinal axis of the backpack with the set of rear wheels positioned downward.

11. The system of claim 10, further comprising a spring-loaded locking mechanism for securing the skateboard to the backpack in one of the folded and unfolded configurations.

12. The system of claim 10, wherein the mount assembly further includes a pivoting mechanism pivotally attached to the skateboard and rotatably attached to the backpack.

13. The system of claim 10, wherein the backpack includes an enclosure for housing the rear wheels when the skateboard is the folded configuration.

14. The system of claim 10, wherein the handle includes two parallel spaced apart tubes and wherein the skateboard is shaped to fit between said tubes when in the folded configuration.

15. The system of claim 10, wherein the backpack further includes one or more straps affixed thereto for carrying the system.

16. The system of claim 10, wherein the backpack further includes a flap detachably affixed thereto for covering the skateboard in the folded configuration.

17. A skateboard backpack system comprising:
article-carrying means having a handle and a set of front wheels affixed thereto;
personal transportation means having a set of rear wheels affixed thereto; and
mounting means for movably joining the article-carrying means and personal transportation means, wherein the mounting means allows the personal transportation means: (i) to pivot along a longitudinal axis of the personal transportation device and to fold into a substantially parallel position relative to a longitudinal axis of the article-carrying means with the set of rear wheels facing the article-carrying means; and (ii) to pivot along the longitudinal axis of the personal transportation device and to unfold into a substantially perpendicular position relative to the longitudinal axis of the article-carrying means with the set of rear wheels positioned downward.

18. The system of claim 17, further comprising a spring-loaded locking mechanism for securing the personal transportation means to the article-carrying means.

19. The system of claim 17, wherein the mounting means further includes pivoting means pivotally attached to the skateboard and rotatably attached to the backpack.

20. The system of claim 17, wherein the article-carrying means includes an enclosure for housing the rear wheels when the personal transportation means are folded.

21. The system of claim 17, wherein the handle includes two parallel spaced apart tubes and the personal transportation means fits between said tubes when folded.

22. The system of claim 17, wherein the article-carrying means further includes one or more straps affixed thereto for carrying the system.

23. The system of claim 17, wherein the article-carrying means further includes a flap detachably affixed thereto for covering the personal-carrying means when folded.

24. A method for converting a skateboard backpack system from a backpack configuration into a skateboard configuration, the method comprising:
extracting an extendible handle of the skateboard backpack system;
rotating a skateboard attached to a backpack of the skateboard backpack system by at about 90° relative to a point of attachment of the skateboard to the backpack;
pivoting the skateboard by about 180° along a longitudinal axis thereof; and
locking the skateboard relative to the backpack at the point of attachment.

25. A method for converting a skateboard backpack system from a skateboard configuration into a backpack configuration, the method comprising:
unlocking a skateboard movably attached to a backpack;
pivoting the skateboard by about 180° along a longitudinal axis thereof;
rotating the skateboard by about 90° relative to a point of attachment of the skateboard to the backpack; and
retracting an extendible handle of the skateboard backpack system.

* * * * *

UNITED STATES PATENT AND TRADEMARK OFFICE
CERTIFICATE OF CORRECTION

| | | |
|---|---|---|
| PATENT NO. | : 8,201,837 B2 | Page 1 of 1 |
| APPLICATION NO. | : 12/603051 | |
| DATED | : June 19, 2012 | |
| INVENTOR(S) | : Steven Dweck | |

It is certified that error appears in the above-identified patent and that said Letters Patent is hereby corrected as shown below:

On the title page, item (75), after "Steven", please delete "Dweek" and insert --Dweck--

Signed and Sealed this
Twenty-eighth Day of August, 2012

David J. Kappos
*Director of the United States Patent and Trademark Office*